(12) United States Patent
Nakagawa et al.

(10) Patent No.: US 11,052,483 B2
(45) Date of Patent: Jul. 6, 2021

(54) LASER WELDING DEVICE AND LASER WELDING METHOD

(71) Applicant: Panasonic Intellectual Property Management Co., Ltd., Osaka (JP)

(72) Inventors: Tatsuyuki Nakagawa, Osaka (JP); Atsuhiro Kawamoto, Hyogo (JP); Junji Fujiwara, Osaka (JP); Noriyuki Matsuoka, Osaka (JP); Wataru Takahashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 268 days.

(21) Appl. No.: 16/094,495

(22) PCT Filed: Apr. 11, 2017

(86) PCT No.: PCT/JP2017/014819
§ 371 (c)(1),
(2) Date: Oct. 18, 2018

(87) PCT Pub. No.: WO2017/203862
PCT Pub. Date: Nov. 30, 2017

(65) Prior Publication Data
US 2019/0118291 A1    Apr. 25, 2019

(30) Foreign Application Priority Data

May 23, 2016  (JP) .............................. JP2016-102153

(51) Int. Cl.
*B23K 26/142* (2014.01)
*B23K 26/21* (2014.01)
(Continued)

(52) U.S. Cl.
CPC ............ *B23K 26/142* (2015.10); *B23K 26/06* (2013.01); *B23K 26/123* (2013.01);
(Continued)

(58) Field of Classification Search
CPC .... B23K 26/06; B23K 26/123; B23K 26/142; B23K 26/1437; B23K 26/1438;
(Continued)

(56) References Cited

U.S. PATENT DOCUMENTS 7,505,504 B2 * 3/2009 Sakai ................. B23K 26/0648
372/55
2004/0127246 A1  7/2004 Hosokawa
(Continued)

FOREIGN PATENT DOCUMENTS

CN    102974939    3/2013
CN    105171238    12/2015
(Continued)

OTHER PUBLICATIONS

Extended European Search Report dated Jun. 21, 2019 in related European Patent Application No. 17802462.6.
(Continued)

*Primary Examiner* — Dana Ross
*Assistant Examiner* — Joseph W Iskra
(74) *Attorney, Agent, or Firm* — Wenderoth, Lind & Ponack, L.L.P.

(57) ABSTRACT

A laser welding device includes a welding head configured to emit a laser beam to a working point, a shield gas supplying nozzle configured to supply shield gas to the working point, and a high-speed air supplying nozzle configured to supply a high-speed air stream between the shield gas supplying nozzle and the welding head, the high-speed air stream having a flow rate that is larger than a flow rate of the shield gas, and being supplied in a horizontal direction
(Continued)

directly above the shield gas supplied to the working point, or in a direction orthogonal to an emission direction of the laser beam. The high-speed air supplying nozzle is disposed in a range from 80 mm to 200 mm, both inclusive, above the working point, or in a range equal to or lower than a half of a working distance between an emission surface of the laser beam of the welding head and the working point, and supplies the high-speed air stream in a belt shape.

16 Claims, 4 Drawing Sheets

(51) Int. Cl.
  *B23K 26/14* (2014.01)
  *B23K 26/12* (2014.01)
  *B23K 26/06* (2014.01)
  *B23K 26/16* (2006.01)

(52) U.S. Cl.
  CPC ...... *B23K 26/1437* (2015.10); *B23K 26/1438* (2015.10); *B23K 26/1476* (2013.01); *B23K 26/1488* (2013.01); *B23K 26/16* (2013.01); *B23K 26/21* (2015.10)

(58) Field of Classification Search
  CPC .................. B23K 26/1476; B23K 26/1488; B23K 26/16; B23K 26/21
  USPC ........................................................ 219/121.6
  See application file for complete search history.

(56) References Cited

U.S. PATENT DOCUMENTS

| 2005/0224470 | A1* | 10/2005 | Burt .............. B23K 26/1437 |
| | | | 219/121.63 |
| 2006/0102600 | A1* | 5/2006 | Schafer ............ B23K 26/1464 |
| | | | 219/121.64 |
| 2008/0031298 | A1 | 2/2008 | Sakai et al. |
| 2016/0354866 | A1 | 12/2016 | Broghammer et al. |

FOREIGN PATENT DOCUMENTS

| DE | 102014203576 | * | 8/2015 |
| EP | 1 806 201 | | 7/2007 |
| GB | 2390319 | | 1/2004 |
| JP | 1-114187 | | 5/1989 |
| JP | 5-122089 | | 5/1994 |
| JP | 2000-263276 | | 9/2000 |
| JP | 2004-200824 | | 7/2004 |
| JP | 2004-306106 | | 11/2004 |
| JP | 2006-142383 | | 6/2006 |

OTHER PUBLICATIONS

English Translation of Chinese Search Report dated Jan. 20, 2020 for the related Chinese Patent Application No. 201780030101.5.
International Search Report of PCT application No. PCT/JP2017/014819 dated May 30, 2017.
English Translation of Search Report dated Jul. 29, 2020 in corresponding Chinese Patent Application No. 201780030101.5.

* cited by examiner

LASER WELDING DEVICE AND LASER WELDING METHOD

This application is a U.S. national stage application of the PCT International Application No. PCT/JP2017/014819 filed on Apr. 11, 2017, which claims the benefit of foreign priority of Japanese patent application 2016-102153 filed on May 23, 2016, the contents all of which are incorporated herein by reference.

TECHNICAL FIELD

The present invention relates to a laser welding device configured to irradiate a welding target with a laser beam to perform welding, and a laser welding method.

BACKGROUND ART

A laser welding device configured to weld a welding target with irradiation of a laser beam needs to protect optical components in its welding head against fumes, spatters, etc. rising from the welding target. To this end, laser welding devices in use include a high-speed air supplying nozzle for supplying a high-speed air stream directly below their welding head. Laser welding devices in use also include a shield gas supplying nozzle for supplying an inert gas that serves as a shield gas to prevent oxidation of a welding target. Such laser welding devices include a low-speed air supplying nozzle between the high-speed air supplying nozzle and the shield gas supplying nozzle to prevent the high-speed air stream from diffusing the shield gas. In such laser welding devices, the low-speed air supplying nozzle supplies a low-speed air stream over the shield gas and protect the shield gas from being diffused by the high-speed air stream (For example, see PTL 1).

CITATION LIST

Patent Literature

PTL 1: Unexamined Japanese Patent Publication No. 2000-263276

SUMMARY

An object of the present invention is to provide a laser welding device that significantly suppresses the amount of a shield gas consumed while preventing oxidation of a welding point, and also protects an optical system in its welding head from welding fumes and spatters.

A laser welding device according to the present invention includes a welding head configured to emit a laser beam to a working point, a shield gas supplying nozzle configured to supply shield gas to the working point, and a high-speed air supplying nozzle configured to supply a high-speed air stream between the shield gas supplying nozzle and the welding head, the high-speed air stream having a flow rate that is larger than a flow rate of the shield gas, and being supplied in a horizontal direction directly above the shield gas supplied to the working point, or in a direction substantially orthogonal to an emission direction of the laser beam. The high-speed air supplying nozzle is disposed in a range from 80 mm to 200 mm (both inclusive) above the working point, or in a range less than or equal to a half of a working distance between an emission surface of the laser beam of the welding head and the working point, and supplies the high-speed air stream in a belt shape.

According to the laser welding device of the present invention, the shield gas supplied from the shield gas supplying nozzle prevents oxidation of a welding target. The high-speed air stream supplied from the high-speed air supplying nozzle that flows directly above the shield gas supplying nozzle removes fumes and spatters rising from the shield gas, and suppresses refraction of a laser beam or fluctuation of a focal point caused by the fumes and spatters. This results in preventing oxidation of a working point of a welding target. Accordingly, a fine bead can be obtained.

The high-speed air stream flowing directly above the shield gas removes fumes and spatters rising from the shield gas away from the optical axis of a laser beam. This enables a significant reduction in the amount of the shield gas usage, thus being cost-effective.

DESCRIPTION OF PREFERRED EMBODIMENTS

The problems of conventional laser welding devices are briefly described prior to describing an exemplary embodiment of the present invention.

The laser welding device of PTL 1 supplies a low-speed air stream between a high-speed air stream supplied directly below its welding head and a shield gas. This protects the shield gas to be diffused by the high-speed air stream. However, the laser welding device of PTL 1 has a long working distance, and thus causes adverse effects, such as refraction of a laser beam and fluctuation of the focal point of a laser beam due to the fumes and spatters rising from a working point in the case of remote welding in which the welding head is positioned away from the working point (for example, about 250 mm or more). The laser welding device of PTL 1 consumes a large amount of expensive shield gas in order to eliminate the adverse effects.

First Exemplary Embodiment

A first exemplary embodiment is described with reference to FIGS. 1 to 4.

Figure 1:
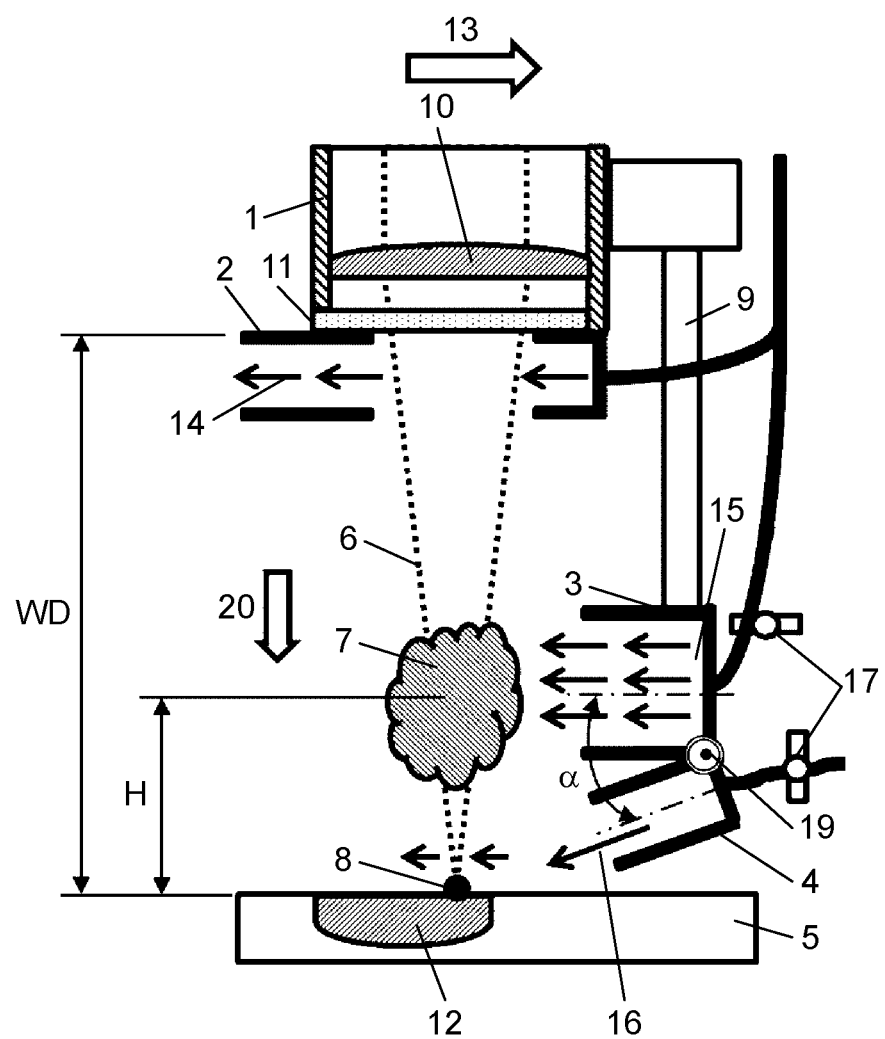
FIG. 1 is a schematic view illustrating a configuration of a laser welding device equipped with a welding head including a shield gas supplying nozzle and a high-speed air supplying nozzle according to a first exemplary embodiment of the present invention.
Figure 2:
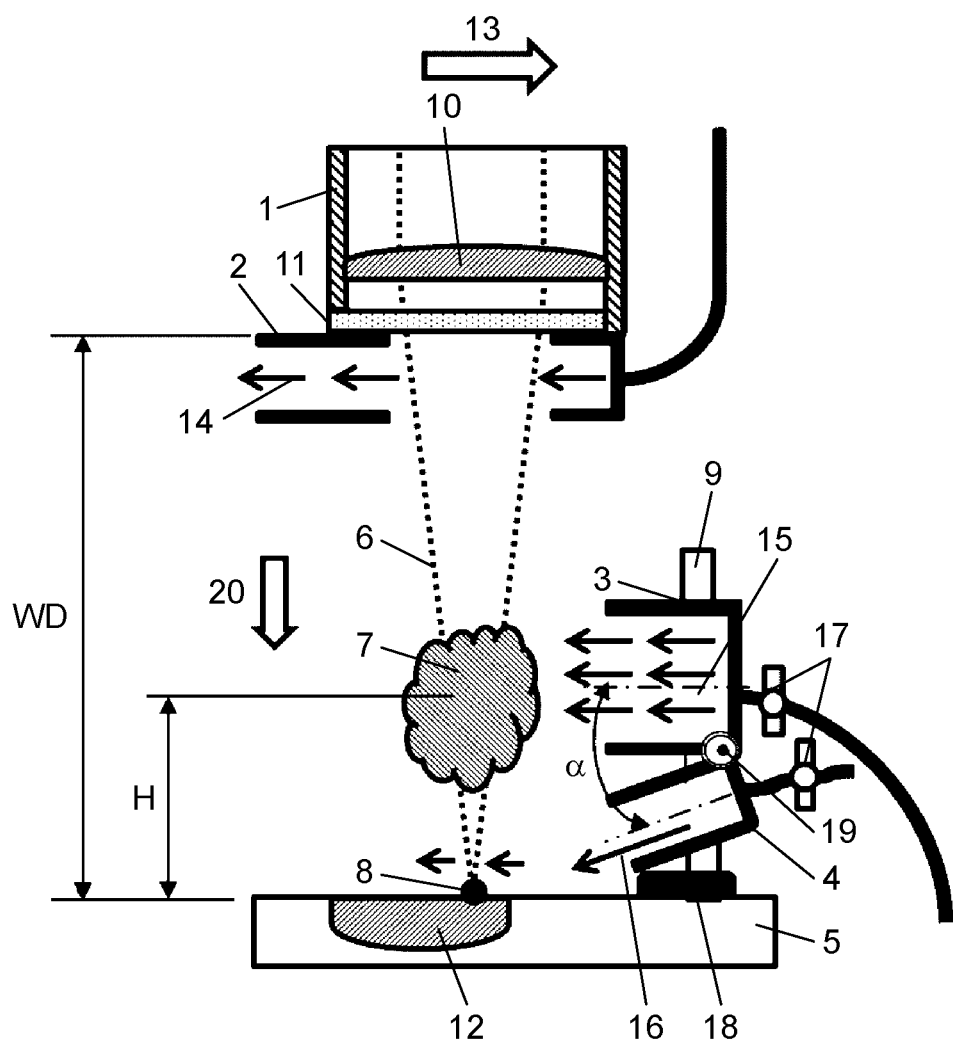
FIG. 2 is a schematic view illustrating a configuration of a laser welding device equipped with a welding jig including a shield gas supplying nozzle and a high-speed air supplying nozzle according to the first exemplary embodiment of the present invention.

FIG. 1 is a schematic view illustrating a configuration of a laser welding device equipped with a welding head including a shield gas supplying nozzle and a high-speed air supplying nozzle according to the first exemplary embodiment of the present invention. FIG. 2 is a schematic view illustrating a configuration of a laser welding device equipped with a welding jig including a shield gas supplying nozzle and a high-speed air supplying nozzle according to the first exemplary embodiment of the present invention.

As illustrated in FIGS. 1 and 2, the laser welding device according to the present exemplary embodiment includes welding head 1, shield gas supplying nozzle 4, and high-speed air supplying nozzle (first air supplying nozzle) 3. Welding head 1 is configured to irradiate working point 8 with laser beam 6 condensed by condensing lens 10 disposed in the laser welding device. Shield gas supplying nozzle 4 is configured to supply shield gas 16 to working point 8 in proximity to working point 8. High-speed air supplying nozzle 3 is configured to supply high-speed air stream 15 between shield gas supplying nozzle 4 and welding head 1. High-speed air supplying nozzle (First air supplying nozzle) 3 is disposed near shield gas supplying nozzle 4, and is configured to supply high-speed air stream (first air stream) 15 with a flow rate (for example, from 100 L/min to 200 L/min both inclusive) that is larger than a flow rate of shield gas 16 (for example, from 20 L/min to 40 L/min both inclusive) so as to blow out fumes 7 and spatters, etc. rising from working point 8 through an atmosphere of the shield gas.

This configuration prevents adverse effects on laser beam 6 that is emitted from welding head 1 toward working point 8 caused by fumes 7 and spatters, etc., such as refraction and fluctuation of the focal distance, and achieves sufficient penetration 12 during welding.

Figure 3:
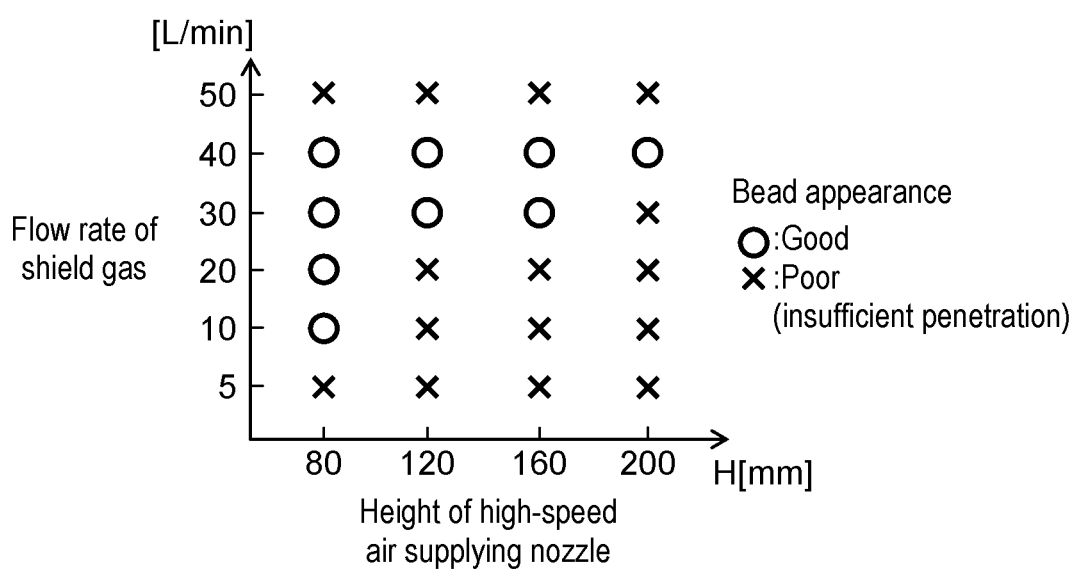
FIG. 3 illustrates a relationship between a flow rate of a shield gas of the shield gas supplying nozzle and a height of the high-speed air supplying nozzle from a working point according to the first exemplary embodiment of the present invention.

FIG. 3 illustrates a relationship between a flow rate of a shield gas of shield gas supplying nozzle 4 and height H of high-speed air supplying nozzle 3 from working point 8 according to the first exemplary embodiment of the present invention. A proper range for obtaining a good welding result can be seen from the relationship shown in FIG. 3. FIG. 3 shows the welding results using "○" and "x". The "○" indicates a good condition in bead appearance, and the "x" indicates a poor condition with insufficient penetration, as a result of visual check. The conditions of welding are as follows. Working distance WD corresponding to a focal distance between an emission surface of laser beam 6 of welding head 1 and working point 8 is 330 mm, a flow rate of high-speed air stream 15 of high-speed air supplying nozzle 3 is 90 L/min, a shield gas is nitrogen, and a material of welding target 5 is stainless steel.

In the case where height H of high-speed air supplying nozzle 3 (a distance from working point 8) is 80 mm, a large number of spatters are generated and a bead appearance is poor (x) with insufficient penetration when a flow rate of the shield gas is less than 10 L/min. A flow rate of the shield gas from 10 L/min to 40 L/min both inclusive provides a good bead appearance (○).

In the cases where height H of high-speed air supplying nozzle 3 is 120 mm and 160 mm, a large number of spatters are generated and a bead appearance is poor (9 with insufficient penetration when a flow rate of the shield gas is less than 30 L/min A flow rate of the shield gas from 30 L/min to 40 L/min both inclusive provides a good bead appearance (○).

In the case where height H of high-speed air supplying nozzle 3 is 200 mm, a large number of spatters are generated and a bead appearance is poor (x) with insufficient penetration when a flow rate of the shield gas is less than 40 L/min. A flow rate of the shield gas of 40 L/min provides a good bead appearance (○).

Whichever height H of the high-speed air supplying nozzle is, a cooling effect of the shield gas causes insufficient penetration and results in a poor bead appearance (x) when a flow rate of the shield gas exceeds 40 L/min In the case where the high-speed air stream is supplied from high-speed air supplying nozzle 3 at height H of less than 80 mm, an atmosphere of the supplied shield gas is affected, which may lead to deterioration of a shielding property at working point 8. In the case where the high-speed air stream is supplied from high-speed air supplying nozzle 3 at height H exceeding 200 mm, an effect of removing spatters is decreased as the high-speed air stream is too far from working point 8 where spatters are generated, which may lead to an increase in adhesion of fumes and spatters to welding head 1.

Figure 4A:
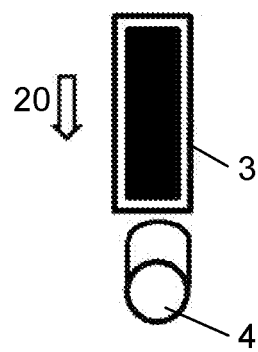
FIG. 4A illustrates an example of a shape of an outlet of each of the high-speed air supplying nozzle and the shield gas supplying nozzle according to the first exemplary embodiment of the present invention.
Figure 4B:
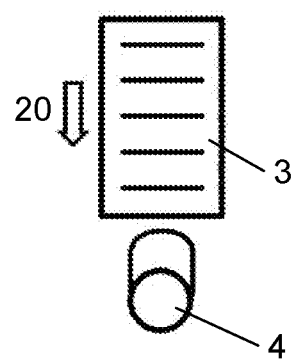
FIG. 4B illustrates another example of a shape of the outlet of each of the high-speed air supplying nozzle and the shield gas supplying nozzle according to the first exemplary embodiment of the present invention.
Figure 4C:
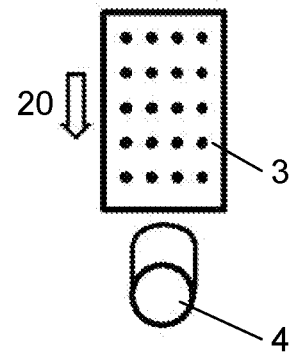
FIG. 4C illustrates a further example of a shape of the outlet of each of the high-speed air supplying nozzle and the shield gas supplying nozzle according to the first exemplary embodiment of the present invention.

FIG. 4A illustrates an example of a shape of an outlet of each of the high-speed air supplying nozzle and the shield gas supplying nozzle according to the first exemplary embodiment of the present invention. FIG. 4B illustrates another example of a shape of the outlet of each of the high-speed air supplying nozzle and the shield gas supplying nozzle. FIG. 4C illustrates a further example of a shape of the outlet of each of the high-speed air supplying nozzle and the shield gas supplying nozzle.

A sectional shape of high-speed air supplying nozzle 3 and a flow rate of high-speed air stream 15 are determined such that high-speed air stream 15 passes across an optical axis of laser beam 6 to sufficiently remove fumes. An outlet of high-speed air supplying nozzle 3 has a belt shape (long shape) elongated in emission direction 20 of laser beam 6 directed from welding head 1 to working point 8. The outlet of high-speed air supplying nozzle 3 has a single-layered shape as shown in FIG. 4A, or a multi-layered shape as shown in FIGS. 4B and 4C.

The outlet of high-speed air supplying nozzle 3 may have a shape in which narrow slits are arrayed in emission direction 20 of laser beam 6 (longitudinal direction of the belt shape) as shown in FIG. 4B, or may have a shape in which small holes are arranged in a matrix in emission direction 20 of laser beam 6 as shown in FIG. 4C.

High-speed air supplying nozzle 3 is not limited to a component formed of a single member. High-speed air supplying nozzle 3 may be a component formed of a combination of nozzles to have a belt shape in emission direction 20 of laser beam 6. This configuration allows a high-speed air stream to blow in a direction crossing or orthogonal to emission direction 20, i.e., a direction substantially orthogonal to an emission direction of laser beam 6 (a horizontal direction in FIGS. 1 and 2) in a belt shape elongated in emission direction 20 of laser beam 6 directed from welding head 1 to working point 8 (a vertical direction in FIGS. 1 and 2). This configuration efficiently removes fumes and spatters, etc. on the optical axis of laser beam 6 that adversely affect on welding, thereby suppressing refraction of laser beam 6 or fluctuation of the focal point due to fumes 7 and spatters, etc. In addition, this configuration prevents decrease in a shielding effect of shield gas 16 blown to working point 8.

Since this configuration is capable of removing fumes and spatters, etc. at a position away from welding head 1, a shielding effect for protective glass 11 of a laser emission port for emitting laser beam 6 from welding head 1.

Shield gas supplying nozzle 4 includes angle adjuster 19 configured to adjust discharge angle α of shield gas 16.

High-speed air supplying nozzle 3 is configured to discharge high-speed air stream 15 that is compressed air, directly above shield gas 16 supplied to working point 8 (closer to welding head 1 in emission direction 20) in a horizontal direction or in a direction substantially orthogonal to emission direction 20 of laser beam 6. A relative angle α formed by high-speed air supplying nozzle 3 and shield gas supplying nozzle 4 configured to discharge shield gas 16 toward working point 8 is between 20 and 70 degrees (both inclusive).

Angle adjuster 19 facilitates adjusting a discharge angle of shield gas 16 toward working point 8, thus enabling adjustment such that discharge of high-speed air stream 15 does not decrease a shielding effect produced by supplying shield gas 16 to working point 8.

When angle α is less than or equal to 20 degree, the angle between shield gas supplying nozzle 4 and high-speed air supplying nozzle 3 is too small, and thus shield gas 16 and high-speed air stream 15 are discharged too closely to each other. Accordingly, shield gas 16 is diffused by high-speed air stream 15 and a shielding effect is decreased, which causes working point 8 to be easily oxidized. When angle α exceeds 70 degree, the angle between shield gas supplying nozzle 4 and high-speed air supplying nozzle 3 is too large, and shield gas 16 is blown to working point 8 in a substantially vertical direction. Therefore, a flow of shield gas 16 discharged against working point 8 is less likely to blow backward that is a direction opposite to welding direction 13 that is a traveling direction of welding head 1 during welding, and is a direction opposite to welding direction 13 with respect to working point 8 irradiated with laser beam 6. This causes shortage of shield gas 16 to be supplied to a bead behind working point 8, the bead having not been finished cooling and hardening after irradiation of laser beam 6 and welding of working point 8, which results in decrease in a shielding effect produced by shield gas 16 and causes working point 8 to be easily oxidized.

Shield gas supplying nozzle 4 has a cylindrical shape for example, has an outlet for discharging shield gas 16 equipped with a mesh having a plurality of holes in a reticulated manner, and is formed of a material, such as copper or brass, of which reflectance against laser beam 6 with a wavelength between 900 nm and 1100 nm (both inclusive) is greater than 80%. Accordingly, even in the case where laser beam 6 is reflected from working point 8, shield gas supplying nozzle 4 is protected from being damaged, such as deformation. This enables shield gas supplying nozzle 4 to be disposed closer to working point 8. Therefore, shield gas 16 can be supplied efficiently toward working point 8.

An outlet of shield gas supplying nozzle 4 for discharging shield gas includes a mesh (not shown) (i.e., a mesh is disposed near a nozzle opening that is an outlet) to rectify the shield gas. This improves a shielding property at working point 8. The laser welding device includes nozzle-height adjuster 9 that is equipped with shield gas supplying nozzle 4 and high-speed air supplying nozzle 3, and is configured to adjust the position of at least one of shield gas supplying nozzle 4 and high-speed air supplying nozzle 3 with respect to working point 8. With this configuration, shield gas supplying nozzle 4 can be disposed near working point 8, even in the case where working point 8 is welded at a position other than a focal point of laser beam 6. Accordingly, the shielding effect is not decreased.

In the laser welding device, nozzle-height adjuster 9 may be provided on welding head 1 as shown in FIG. 1, or may be provided on welding jig 18 for securing welding target 5 at a predetermined position as shown in FIG. 2. The mounting position of nozzle-height adjuster 9 is selectable according to a processing target. In the case where welding target 5 to be processed has a simple shape, nozzle-height adjuster 9 is mounted on welding head 1 so that low-speed air supplying nozzle (second air supplying nozzle) 2, high-speed air supplying nozzle (first air supplying nozzle) 3, and shield gas supplying nozzle 4 can move as a set of supplying nozzles together with welding head 1 corresponding to a position of working point 8 of welding target 5. In this case, low-speed air supplying nozzle 2 is provided on welding head 1. High-speed air supplying nozzle 3 and shield gas supplying nozzle 4 are provided on nozzle-height adjuster 9. This can reduce the initial cost of the device. On the other hand, in the case where welding target 5 has a complex shape, high-speed air supplying nozzle 3 and shield gas supplying nozzle 4 are provided on nozzle-height adjuster 9 as a set of supplying nozzles, and more than one nozzle-height adjuster 9 as a set of supplying nozzles is mounted on welding jig 18 at a position corresponding to working point 8 of welding target 5. This reduces restriction against a moving range of welding head 1. Accordingly, welding target 5 can be processed with conditions more suitable for the shape of welding target 5, such as a head inclination of welding head 1 or a working distance.

At least shield gas supplying nozzle 4 and high-speed air supplying nozzle 3 mounted on welding head 1 are provided rotatably around the optical axis of laser beam 6 so as to be directed according to welding direction 13 that is a traveling direction of welding head 1 during welding, preferably such that shield gas 16 and high-speed air stream 15 are discharged in a direction opposite to welding direction 13.

Shield gas supplying nozzle 4, high-speed air supplying nozzle 3, and low-speed air supplying nozzle 2 are referred to as supplying nozzles. With respect to the rotation of the supplying nozzles according to welding direction 13, it is more desirable that blowing directions from the supplying nozzles are arranged in the same direction since spatters generated at working point 8 are efficiently removed. In other words, it is more desirable that the supplying nozzles mounted on welding head 1 are disposed in a rotatable and movable manner with respect to the optical axis of laser beam 6 emitted toward working point 8 according to welding direction 13.

With this configuration, the shield gas can be supplied in any directions at all times so that high-speed air stream 15 and the like are prevented from blowing in the traveling direction of welding even when laser beam 6 is scanned at high speed in welding direction 13 or the traveling direction of welding, which enables stable formation of a bead. In addition, the supplying nozzles are disposed ahead of welding head 1 with respect to the traveling direction of welding at all times, which also facilitates forming a welding program to avoid contact with welding jig 18.

In addition to high-speed air supplying nozzle (first air supplying nozzle) 3, the laser welding device further includes low-speed air supplying nozzle (second air supplying nozzle) 2 configured to supply low-speed air stream (second air stream) 14 from directly below welding head 1 in a direction not to disturb shield gas 16. Specifically, the laser welding device includes low-speed air supplying nozzle 2 near the laser emission port of welding head 1 for emitting laser beam 6. Low-speed air supplying nozzle 2 is configured to supply low-speed air stream 14 with a low flow rate (e.g., between 50 L/min and 100 L/min (both inclusive)) so as to prevent fumes and spatters, etc. from being adhered to protective glass 11 provided on a surface from which laser beam 6 from welding head 1 is emitted. In other words, high-speed air supplying nozzle 3 is disposed between low-speed air supplying nozzle 2 and shield gas supplying nozzle 4. Low-speed air stream 14 prevents fumes 7 and spatters, etc. from being adhered to protective glass 11.

Low-speed air supplying nozzle 2 may be provided in the same manner as shield gas supplying nozzle 4 and high-speed air supplying nozzle 3 such that discharge of low-speed air stream 14 from low-speed air supplying nozzle 2 is directed according to welding direction 13 that is a traveling direction of welding head 1 during welding, preferably such that a direction of shield gas 16 and high-speed air stream 15 may be rotatable around the optical axis of laser beam 6.

The laser welding device includes opening/closing valves 17 configured to regulate shield gas 16 and high-speed air stream 15 respectively to be supplied corresponding to timings at which laser beam 6 is emitted to a plurality of working points 8 of welding target 5. This configuration suppresses consumption of shield gas 16 and high-speed air stream 15.

As described above, the laser welding device according to the present exemplary embodiment includes welding head 1 configured to emit laser beam 6 to working point 8, shield gas supplying nozzle 4 configured to supply shield gas 16 to working point 8, and high-speed air supplying nozzle 3 configured to supply high-speed air stream 15 between shield gas supplying nozzle 4 and welding head 1, high-speed air stream 15 having a flow rate that is larger than a flow rate of shield gas 16, and being supplied in a horizontal direction directly above shield gas 16 supplied to working point 8, or in a direction substantially orthogonal to emission direction 20 of laser beam 6. High-speed air supplying nozzle 3 is disposed in a range from 80 mm to 200 mm (both inclusive) above working point 8, or in a range equal to or lower than a half of working distance WD between an emission surface of laser beam 6 of welding head 1 and working point 8, and supplies high-speed air stream 15 in a belt shape.

With this configuration, shield gas 16 supplied from shield gas supplying nozzle 4 prevents oxidation of welding target 5 even in the case where a welding head is positioned away from the working point as in remote welding. High-speed air stream 15 supplied from high-speed air supplying nozzle 3 that flows directly above shield gas 16 can remove fumes 7 and spatters, etc. rising from working point 8 through shield gas 16. This configuration can provide a bead in a good condition in which oxidation of working point 8 of welding target 5 is prevented, while suppressing refraction of laser beam 6 or fluctuation of the focal point caused by fumes 7 and spatters, etc.

High-speed air stream 15 that flows directly above shield gas 16 prevents fumes and spatters from being adhered to the emission surface of welding head 1 for emitting laser beam 6 from welding head 1. High-speed air stream 15 that flows directly above shield gas 16 removes fumes 7 and spatters, etc. rising from working point 8 through shield gas 16. This configuration achieves a significant reduction in usage of shield gas 16. Accordingly, oxidation of welding target 5 is prevented with a small amount of shield gas 16. This provides good welding performance.

The outlet of high-speed air supplying nozzle 3 may have a multi-layered or a single-layered belt shape elongated in the emission direction in which laser beam 6 is emitted from welding head 1 to working point 8.

The laser welding device according to the present exemplary embodiment may further include angle adjuster 19 configured to adjust a discharge angle of each of high-speed air supplying nozzle 3 and shield gas supplying nozzle 4. It is preferable that angle adjuster 19 adjusts a relative angle between high-speed air supplying nozzle 3 and shield gas supplying nozzle 4 to have an angle between 20 and 70 degrees (both inclusive).

The laser welding device according to the present exemplary embodiment may further include nozzle-height adjuster 9 equipped with shield gas supplying nozzle 4 and high-speed air supplying nozzle 3, and is configured to adjust a height of shield gas supplying nozzle 4 with respect to working point 8.

It is preferable that shield gas supplying nozzle 4 has a cylindrical shape, has an outlet for discharging shield gas 16 equipped with a mesh having a plurality of holes in a reticulated manner, and is formed of a material of which reflectance against laser beam 6 with a wavelength between 900 nm and 1100 nm (both inclusive) is greater than 80%.

In the laser welding device according to the present exemplary embodiment, angle adjuster 19 may be included in welding head 1.

In the laser welding device according to the present exemplary embodiment, nozzle-height adjuster 9 may be included in welding head 1.

In the laser welding device according to the present exemplary embodiment, angle adjuster 19 may be included in welding jig 18.

In the laser welding device according to the present exemplary embodiment, nozzle-height adjuster 9 may be included in welding jig 18.

The laser welding device according to the present exemplary embodiment may further include low-speed air supplying nozzle 2 provided directly below welding head 1 and configured to supply low-speed air stream 14 in a direction that does not interfere shield gas 16 discharged from shield gas supplying nozzle 4 and is identical to a direction in which high-speed air stream 15 is supplied from high-speed air supplying nozzle 3. It is preferable that shield gas supplying nozzle 4, high-speed air supplying nozzle 3, and low-speed air supplying nozzle 2 that are mounted on welding head 1 are disposed in a rotatable and movable manner with respect to the optical axis of laser beam 6 according to welding direction 13.

In a laser welding method according to the present exemplary embodiment, a laser welding device includes welding head 1 configured to emit laser beam 6 to working point 8, shield gas supplying nozzle 4 configured to supply shield gas 16 to working point 8, and high-speed air supplying nozzle 3 configured to supply high-speed air stream 15 between shield gas supplying nozzle 4 and welding head 1, high-speed air stream 15 having a flow rate that is larger than a flow rate of shield gas 16, and being supplied in a horizontal direction directly above shield gas 16 supplied to working point 8, or in a direction substantially orthogonal to an emission direction of laser beam 6, in which high-speed air supplying nozzle 3 is disposed in a range from 80 mm to 200 mm (both inclusive) above working point 8, or in a range equal to or lower than a half of working distance WD between an emission surface of laser beam 6 of welding head 1 and working point 8, and the method includes supplying high-speed air stream 15 in a belt shape.

A laser welding device according to the present invention can achieve good welding conditions with a small amount of shield gas, and is industrially useful.

The invention claimed is:

1. A laser welding device comprising:
a welding head configured to emit a laser beam to a working point;
a shield gas supplying nozzle configured to supply shield gas to the working point; and
a first air supplying nozzle configured to supply a first air stream between the shield gas supplying nozzle and the welding head, such that the first air stream has a flow rate that is larger than a flow rate of the shield gas, and is supplied in a horizontal direction directly above the shield gas supplied to the working point, or in a direction substantially orthogonal to an optical axis of the laser beam emitted in an emission direction of the laser beam,
wherein:
the first air supplying nozzle is disposed 80 mm to 200 mm above the working point, or in a range equal to or lower than a half of a working distance between an emission surface of the laser beam of the welding head and the working point, and
the first air supplying nozzle supplies the first air stream in a belt shape that is elongated in the emission direction of the laser beam along the optical axis.

2. The laser welding device according to claim 1, wherein an outlet of the first air supplying nozzle has a multi-layered or a single-layered belt shape.

3. The laser welding device according to claim 1, further comprising an angle adjuster configured to adjust a discharge angle of each of the first air supplying nozzle and the shield gas supplying nozzle, wherein
the angle adjuster adjusts a relative angle between the first air supplying nozzle and the shield gas supplying nozzle to have an angle of 20 to 70 degrees.

4. The laser welding device according to claim 1, further comprising a nozzle-height adjuster that is equipped with the shield gas supplying nozzle and the first air supplying nozzle and that is configured to adjust a height of the shield gas supplying nozzle with respect to the working point.

5. The laser welding device according to claim 1, wherein the shield gas supplying nozzle has a cylindrical shape, has an outlet for discharging the shield gas equipped with a mesh, and is formed of a material of which reflectance against a laser beam with a wavelength of 900 nm to 1100 nm is greater than 80%.

6. The laser welding device according to claim 3, wherein the angle adjuster is included in the welding head.

7. The laser welding device according to claim 4, wherein the nozzle-height adjuster is included in the welding head.

8. The laser welding device according to claim 3, wherein the angle adjuster is included in a welding jig.

9. The laser welding device according to claim 4, wherein the nozzle-height adjuster is included in a welding jig.

10. The laser welding device according to claim 1, further comprising a second air supplying nozzle provided directly below the welding head and configured to supply a second air stream having a flow rate that is smaller than or equal to a flow rate of the first air stream so as to prevent fumes and spatters from being adhered to a protective glass provided on a surface of the welding head from which the laser beam is emitted, the second air stream being supplied in a direction that does not interfere with the shield gas discharged from the shield gas supplying nozzle, and is identical to a direction in which the first air stream is supplied from the first air supplying nozzle, wherein
the first air supplying nozzle is disposed between the second air supplying nozzle and the shield gas supplying nozzle.

11. A method of laser welding, the method comprising:
providing a laser welding device including:
a welding head configured to emit a laser beam to a working point;
a shield gas supplying nozzle configured to supply shield gas to the working point; and
a first air supplying nozzle configured to supply a first air stream between the shield gas supplying nozzle and the welding head, such that the first air stream has a flow rate that is larger than a flow rate of the shield gas, and is supplied in a horizontal direction directly above the shield gas supplied to the working point, or in a direction substantially orthogonal to an optical axis of the laser beam emitted in an emission direction of the laser beam,
wherein the first air supplying nozzle is 80 mm to 200 mm above the working point, or in a range equal to or lower than a half of a working distance between an emission surface of the laser beam of the welding head and the working point; and
supplying the first air stream in a belt shape that is elongated in the emission direction of the laser beam along the optical axis.

12. The method of laser welding according to claim 11, further comprising setting a relative angle between the first air supplying nozzle and the shield gas supplying nozzle to an angle of 20 to 70 degrees.

13. The method of laser welding according to claim 12, further comprising adjusting, with an angle adjuster, a discharge angle of each of the first air supplying nozzle and the shield gas supplying nozzle, wherein the angle adjuster is included in the welding head.

14. The method of laser welding according to claim 12, further comprising adjusting, with an angle adjuster, a discharge angle of each of the first air supplying nozzle and the shield gas supplying nozzle, wherein the angle adjuster is included in a welding jig.

15. The laser welding device according to claim 1, wherein the shield gas supplying nozzle and the first air supplying nozzle are positioned ahead of the welding head relative to a traveling direction of the welding head.

16. The laser welding device according to claim 10, wherein the welding head is movable in a welding direction, and
the shield gas supplying nozzle, the first air supplying nozzle, and the second air supplying nozzle are positioned ahead of the welding head relative to the welding direction.

* * * * *